(No Model.) 2 Sheets—Sheet 1.
G. D. HOLT & W. T. McGINTY.
DUCT CONDUIT FOR ELECTRICAL CONDUCTORS.
No. 358,778. Patented Mar. 1, 1887.
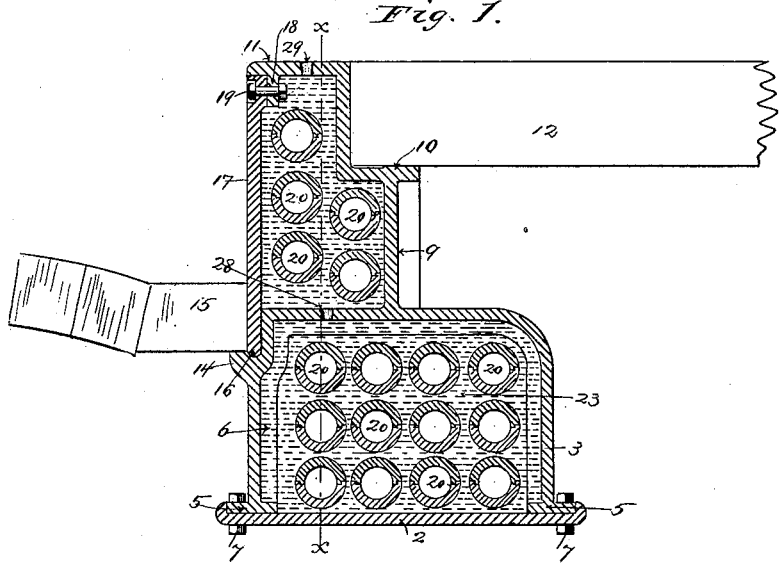
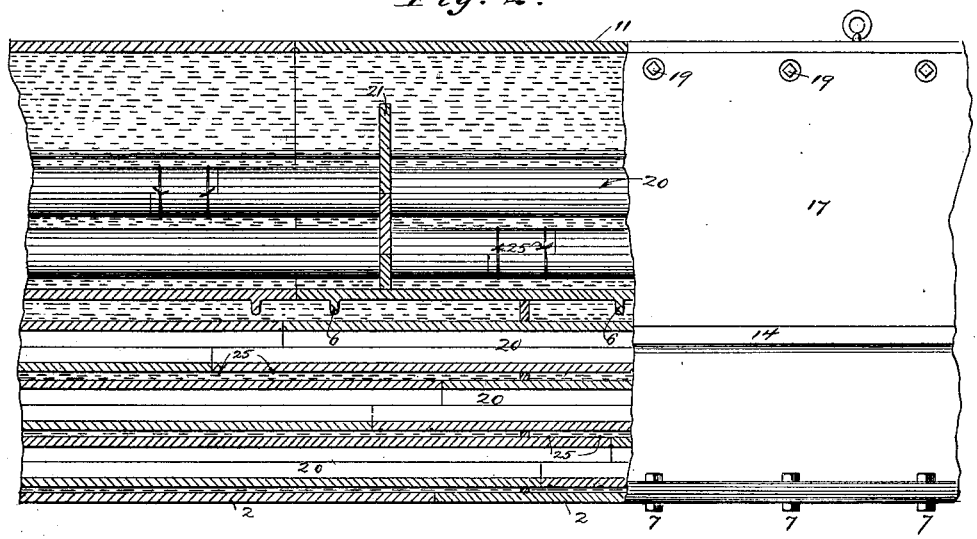
Witnesses
A. M. Gaskell.
R. H. Sanford.
Inventors
George D. Holt
and
William T. McGinty
By A. C. Paul
Atty

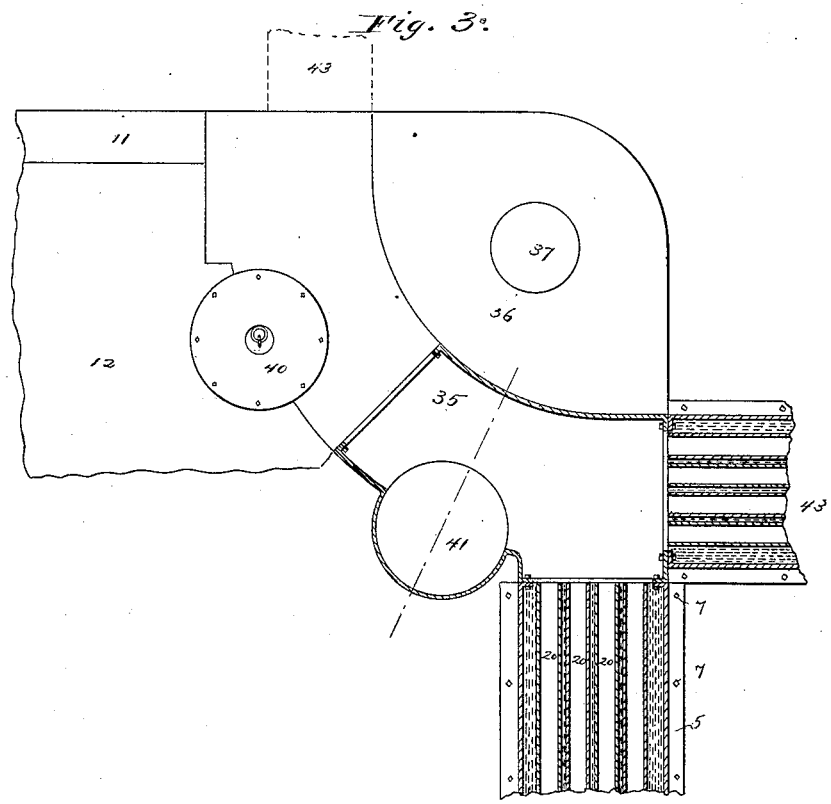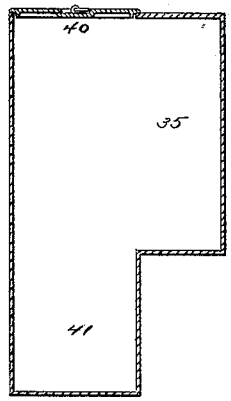

UNITED STATES PATENT OFFICE.

GEORGE D. HOLT AND WILLIAM T. McGINTY, OF MINNEAPOLIS, MINNESOTA; SAID McGINTY ASSIGNOR TO SAID HOLT.

DUCT-CONDUIT FOR ELECTRICAL CONDUCTORS.

SPECIFICATION forming part of Letters Patent No. 358,778, dated March 1, 1887.

Application filed September 15, 1886. Serial No. 213,564. (No model.)

*To all whom it may concern:*

Be it known that we, GEORGE D. HOLT and WILLIAM T. McGINTY, of Minneapolis, in the county of Hennepin and State of Minnesota, have invented certain Improvements in Duct-Conduits for Electrical Conductors, of which the following is a specification.

The objects that we have in view are to provide a conduit having a series of permanent ducts which are preferably insulated from each other, through which any number of electrical conductors may be passed; also to provide a duct-conduit that may take the place of the usual street-curb and be located at the outer edge of the sidewalk, so that it will not be necessary to dig up any portion of the street-pavement in order to put the conduit in place, and from which the conductors may be conveniently led to any desired points in the adjacent blocks or to street-lights in the vicinity; also to provide such a conduit with suitable junction-boxes, preferably located at the street corners and alley-ways, by means of which access may be had to the conduits and electrical conductors for the purpose of drawing in and out said conductors, making connections, necessary repairs, and testing or for other purposes.

Other objects of the invention will appear from the following detailed description.

In the accompanying drawings forming part of this specification, Figure 1 is a transverse vertical section of a conduit embodying our invention, showing the relative positions of the conduit or conduits, sidewalk, gutter-stone, and street-pavement. Fig. 2 is a partial front elevation and partial longitudinal section on line X X of Fig. 1. Fig. 3 is a plan and partial section showing the arrangement of the junction-boxes and conduits. Fig. 4 is a cross-section on the line Y Y, Fig. 3, showing the construction of the junction-boxes.

The conduit has preferably two chambers or compartments, a lower compartment which is designed to be the larger in size and to be placed below the surface of the street and to extend for a short distance under the sidewalk. In the following description we have termed this the "main" chamber. The other compartment or chamber is located above the main chamber and forms the street-curb. This we have termed the "curb" chamber.

In the accompanying drawings, 2 2 represent the bottom or base plates of the conduit. They are of any suitable length, width, and thickness.

3 represents a cast-metal shell, that is preferably of substantially rectangular form in cross-section. It is open at the bottom, and provided at its outer edges with suitable flanges, 5, through which the bolts, keys, or other fastenings, 7, pass that secure it to the bottom plate, 2. The shell may also be provided upon its inner surface with suitable strengthening-ribs, 6. A web or plate, 9, rises from about the center of the top of the shell 3, being cast integrally therewith, or being formed separately and secured thereto by any suitable means. This shell may also be provided with strengthening-ribs.

An offset or shoulder, 10, is formed in the vertical plate 9, which serves as a support for the sidewalk-flagging or area-covering 12. The upper edge of the plate 9 is joined to a horizontal plate, 11, that forms the top of the curb, and is preferably flush with the sidewalk 12. The plates 9 and 11 may be formed in one piece.

The side of the conduit that is toward the street we term the "front," and the opposite side the "rear."

Upon the front of the shell 3, preferably at a point a short distance below its top, we prefer to provide a projecting rib or shoulder, 14, which forms a support for one edge of the gutter-stone 15. The wall of the shell is preferably offset for about its thickness above the shoulder 14, and a groove or channel, 16, is formed back of the shoulder, as shown in Fig. 1.

A front plate, 17, has its lower edge adapted to fit into the recess 16, and its upper edge fits under the forward edge of the plate 11, which is preferably provided with a downwardly-projecting rib, 18, to which the plate 17 is secured by suitable bolts or other fastening devices, 19.

It will be seen that the parts already described form a double conduit, the lower chamber being open at the bottom and provided with a suitable closing-plate, and the upper chamber forming the street-curb and being open at the front and provided with a suitable closing-plate. The conduit thus formed is very strong and capable of sustaining great weight. It forms a support for the gutter-stone upon one side and the sidewalk-flagging on the other. The lower or larger portion of the conduit makes a firm base for the whole. In each chamber of the conduit we arrange a series of ducts, 20, through which the electrical conductors are passed. These ducts may be formed of wood or other suitable material. They are preferably each divided longitudinally into two sections, which are fitted together by suitable joints.

The ducts are supported and spaced in the conduit by suitable blocks, 21, arranged at any convenient distance apart. A filling, 23, of any non-conducting material, is put into each chamber of the conduit, surrounding the ducts and filling the spaces between them. By this means the ducts are properly insulated and maintained in their positions. When the ducts are divided longitudinally, their sections are arranged to overlap each other, and thus break joints transversely. The overlapping ends of the sections of the ducts may then be secured together by wires 25, that are twisted around them, being preferably arranged in recesses near the ends of the sections. The separate ducts may also be arranged to break joints; or in arranging the ducts in the conduits no special attention need be paid to the position of the joints, which may come opposite each other or not, as the case may be. The transverse joint in each duct is therefore entirely independent of the transverse joints in the other ducts, and these joints in the ducts are independent of the transverse joints in the sections of the conduits. The sections of the ducts and the sections of the conduits will break joints with one another. We therefore call the sections "independently jointed."

The base-plates 2, the main shells or portions 3, and the front plates or covers, which together make up the conduit, are arranged so as to break joints with each other, as thereby the several sections are secured by their overlapping parts, and no other or extraneous devices are required to joint or secure the sections of the conduit together.

The manner of laying the conduit is as follows: The base-plates 2 are first put into position at the proper distance below the surface of the ground. The ducts for the lower chamber are then piled up on this plate, being spaced and supported by the blocks 21. The shell 3 is then placed over the ducts and bolted to the plate. The non-conducting filling, in a liquid state, is then poured into the conduit through openings 28 in its top. The ducts are then piled up in the upper or curb chamber in a similar manner. The front plate is put in position and bolted or keyed, and the filling for this part is then poured in through openings 29 in its top. By laying the conduit in this manner the joints or line of contact between the sections of the conduit and those between the sections of the ducts may be entirely independent of each other. When a duct-conduit is formed in the usual way, the joints in the conduit and those in the ducts coincide, and a special device is necessary to properly secure or joint the sections together. This is wholly avoided by the use of our independently-jointed sectional ducts and sectional conduits.

The arrangement of the junction-boxes as we prefer to use them is shown in Fig. 3. The conduits extend along the edges of the sidewalks, and at the alley-ways and street-corners they are connected by junction-boxes 35. These boxes preferably extend diagonally across from the end of one conduit to the end of the other at right angles to it, or at such an angle as may be made necessary from the line of the street.

As the street-corners are generally provided with corner-stones 36, having man-holes 37, through which access may be had to the sewer-traps, the junction-boxes are preferably curved, as shown in Fig. 3, so as to extend around and avoid these corner-stones and the sewer-connections.

The junction-boxes are provided with man-holes 40, and have preferably a well, 41, below each man-hole, to enable any person to get far enough down in the box to be able to manipulate the wires. Besides being used at the street-corners, the junction-boxes may be used at any other points where they may be advantageous. The wells 41 are arranged at one side of the junction-box, and partly in a portion projecting from the wall thereof, as shown. As the wells extend below the bottoms of the junction-boxes, the cables or wires can be supported upon the bottoms of the boxes, which may be substantially on a level with the bottoms of the conduits.

Suitable crossing conduits, 43, are connected with the junction-boxes, and extend beneath the pavements. These conduits may be similar to the others, with the curb portions removed.

We are aware that curb-conduits for electrical conductors are not broadly new, and hence do not claim the same; but What we do claim as our invention is—

1. A conduit comprising a sectional casing and a series of independent sectional ducts arranged within said casing, the sections of the casing and the several sections of the ducts being arranged to break joints, as described, and for the purpose set forth.

2. A conduit comprising a sectional base-plate, 2, and an inverted sectional shell, 3, secured thereto, the sections of said base-plate and shell breaking joints with each other transversely, substantially as described.

3. A conduit comprising a sectional casing and a series of independent sectional ducts arranged within said casing, the sections of the casing and the sections of the ducts being arranged to break joints, as described, and a non-conducting material filling said conduit and surrounding said ducts, substantially as described.

4. A conduit comprising a casing formed of transversely and longitudinally divided sections and a series of independent ducts arranged within said casing, the sections of the ducts and the sections of the casing being independently jointed, as described, as and for the purpose set forth.

5. A conduit comprising a lower conduit-chamber formed of a base-plate, 2, and a removable inverted shell, 3, and an upper independent conduit-chamber having a removable front, substantially as described.

6. A curb-conduit formed of a sectional casing and a sectional removable front, the sections of the casing and the sections of the front breaking joints with each other, substantially as described.

7. A curb-conduit formed of a sectional casing and a sectional removable front, and independent sectional ducts arranged in said conduit, the sections of the casing of the front and of the ducts being independently jointed, as described, and for the purpose set forth.

8. A double conduit comprising a lower chamber formed of a sectional base-plate, a sectional inverted shell, 3, secured thereto, and an upper independent chamber formed of a casing supported upon said inverted shell and having an open front, and a removable front plate secured to said upper casing, substantially as described.

9. The combination, with the conduit-casing having the open front, and the ledge 14, having a recess behind it, of the front plate, 17, having its lower edge fitting into said recess and its upper edge secured to the top of the casing, substantially as described.

GEORGE D. HOLT.
WILLIAM T. McGINTY.

Witnesses:
A. C. PAUL,
A. M. GASKELL.